US006224844B1

(12) United States Patent
VerNooy et al.

(10) Patent No.: US 6,224,844 B1
(45) Date of Patent: May 1, 2001

(54) PROCESS FOR THE PRODUCTION OF CALCIUM FLUORIDE

(75) Inventors: Paul Douglas VerNooy, Media; John Byrne Michel, West Chester, both of PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/393,914

(22) Filed: Sep. 10, 1999

Related U.S. Application Data
(60) Provisional application No. 60/101,198, filed on Sep. 21, 1998.

(51) Int. Cl.$^7$ .............................. C01F 11/22; C01B 7/19
(52) U.S. Cl. ...................... 423/490; 423/483; 423/484; 423/157.3; 423/158
(58) Field of Search .................................. 423/490, 483, 423/484, 157.2, 151.3, 158

(56) References Cited

U.S. PATENT DOCUMENTS 4,132,765 * 1/1979 Yates .
5,531,975 * 7/1996 Erickson et al. .

* cited by examiner

*Primary Examiner*—Steven P. Griffin
*Assistant Examiner*—Christina Ildebrando
(74) *Attorney, Agent, or Firm*—James E. Shipley

(57) ABSTRACT

A process is disclosed for producing calcium fluoride comprising: (a) mixing aqueous $H_3PO_4$ with aqueous $H_2SiF_6$ to form a mixture such that the concentration of $H_3PO_4$ is at least about 3 moles/liter, (b) adding phosphate rock to the mixture at a rate such that the pH of the mixture is maintained at less than about 1.0 and at a temperature sufficient to form a second mixture containing calcium fluoride, and (c) separating calcium fluoride from the second mixture.

10 Claims, No Drawings

PROCESS FOR THE PRODUCTION OF CALCIUM FLUORIDE

This application claims benefit of Provisional application Ser. No. 60/101,198, filed Sep. 21, 1998.

FIELD OF THE INVENTION

This invention relates to a process for the manufacture of calcium fluoride and more particularly to its production by the reaction of fluosilicic acid (i.e., FSA or aqueous $H_2SiF_6$) with phosphate rock containing fluorapatite.

BACKGROUND

Fluorine is an essential element for producing fluorochemicals and fluoropolymers and is currently derived, primarily, from fluorspar, a mineral which is a crystalline form of calcium fluoride. However, world-wide reserves of fluorspar are being depleted and new economical sources of fluorine are desired.

An important reserve of fluorine is phosphate rock which contains a variety of apatites including fluorapatite, i.e., $CaF_2 \cdot 3Ca_3(PO_4)_2$, a mineral which is used for the manufacture of phosphoric acid. This mineral constitutes a fluorine reserve which is about four times greater than the proven reserves of fluorspar. During the manufacture of phosphoric acid most of the fluorine is removed as fluosilicic acid (FSA). There is some demand for FSA for fluoridating drinking water and for the manufacture of cryolite and aluminum fluoride. However, because this demand is small, most of the FSA produced during phosphoric acid manufacture is wasted, e.g., it is sent to a waste-water pond with the fluorine ending up in the surrounding environment and can cause an environmental pollution problem.

Over the years numerous processes, several of which are described below, have been developed to recover the fluorine from phosphate minerals. The United States Bureau of Mines (Chem. Abst., 75:23270, 1971) has shown how waste fluosilicic acid can be converted to an acid-grade fluorspar ($CaF_2$). A first step involves treating the FSA with ammonia to precipitate silica, which is removed by filtration to form $NH_4F$. In a second step ammonium fluoride is treated with lime to form $CaF_2$.

U.S. Pat. No. 5,531,975 describes a process for reacting phosphate rock and FSA to produce a slurry comprising phosphoric acid, calcium fluoride, silicon dioxide and undigested phosphate rock. An excess stoichiometric amount of calcium to fluoride is initially present in the slurry. The product slurry is pumped into a vacuum filter or centrifuge where the phosphoric acid and colloidal calcium fluoride are separated from the undigested phosphate rock and silic. In Example 1 of the '975 patent, the weight ratio of F:Si in the product (initial filtrate) is shown to be about 30:1.

Surprisingly, a process has been discovered which yields a much more efficient process for producing calcium fluoride from FSA, with much higher recovery of fluorine from the FSA and calcium fluoride containing much lower levels of silica than previously.

SUMMARY OF THE INVENTION

This invention provides a process for producing calcium fluoride comprising:

(a) mixing aqueous $H_3PO_4$ with aqueous $H_2SiF_6$ to form a mixture such that the concentration of $H_3PO_4$ is at least about 3 moles/liter, (b) adding phosphate rock to the mixture at a rate such that the pH of the mixture is maintained at less than about 1.0 and at a temperature sufficient to form a second mixture containing calcium fluoride, and (c) separating calcium fluoride from the second mixture.

DETAILED DESCRIPTION

The phosphate rock useful in the current process is any naturally occurring phosphate rock typically composed primarily of tricalcium phosphate ($Ca_3(PO_4)_2$), calcium carbonate ($CaCO_3$) and calcium fluoride ($CaF_2$). This phosphate rock may also be used for the manufacture of phosphoric acid.

The concentration and source of aqueous $H_2SiF_6$ used in this process is not critical. The aqueous fluosilicic acid (FSA) produced by a phosphate plant may be used, which is typically 20–30% by weight $H_2SiF_6$.

The concentration and source of aqueous phosphoric acid used in step (a) described above is not critical and may be from about 50 to 100 weight %, but is preferably from about 80 to 90 weight %, but more preferably about 85 weight %.

The acids may be mixed in any manner known to a person of ordinary skill in the art to form a mixture of the acids. For example, they may be combined in a stirred reactor such that the molar phosphoric acid concentration is at least about 3 moles/liter, preferably 4 moles/liter.

The phosphate rock must be added to the mixture of the acids at a temperature sufficient to form calcium fluoride. This temperature may be achieved by heating the combined-acid mixture to a temperature sufficient to initiate the decomposition of FSA and to form calcium fluoride when phosphate rock is added. By "a temperature sufficient to form a second mixture containing calcium fluoride" is meant a temperature which is sufficient to initiate the decomposition of FSA when the phosphate rock is added to the mixture of acids and to cause calcium fluoride to form. Typically, this temperature may be at least about 50° C., preferably at least about 80° C., and more preferably at least about 90° C.

Phosphate rock should be added to the mixture of the acids at a rate such that the pH of the mixture is maintained at less than about 1.0, preferably at less than about 0.7, and more preferably at less than about 0.5. The quantity of phosphate rock is not critical and may be added until all the FSA is decomposed. Typically, addition of the phosphate rock is continued until the Ca:F weight ratio is at least 1.2:1.

After addition of phosphate rock to the mixture of the acids to form a second mixture containing calcium fluoride, the calcium fluoride may be separated from any undigested phosphate rock and silica by any method known to those skilled in the art. For example, the calcium fluoride may be recovered by any solid-liquid separation technique such as filtration, decantation or centrifugation. Filtration may be done using the second mixture containing the calcium fluoride before it is cooled, or the second mixture may be cooled prior to the separation. The separation step can be operated either in batch or continuous modes. Separation may include washing of the calcium fluoride using standard techniques (e.g., with water following initial filtration, centrifugation or decantation).

Separation may be enhanced by heating the second mixture to near reflux for at least about 0.5 hours, preferably for about 1 hour. This heating is done in part to insure agglomeration of the insoluble silicon compounds present in the second mixture. The second mixture may then be sent to a centrifuge or filter to separate the colloidal (less than $1\mu$) calcium fluoride and phosphoric acid from the undigested phosphate rock and silica. The components of the second mixture can also be separated by gravity settling.

The separated calcium fluoride may contain about 20–50 wt. % phosphate, depending on the molarity of the phosphoric acid originally used. After the silica and undigested phosphate rock have been removed, calcium fluoride remains suspended in aqueous phosphoric acid. Additional rock may be added to the suspension in an amount such that the ratio of Ca:F is at least about 1.3:1. This addition may be done to remove any soluble silicon compounds remaining in the calcium fluoride suspension. In a further step sulfuric acid may be mixed with this calcium fluoride suspension to produce hydrogen fluoride. If the temperature of the mixing of sulfuric acid with the calcium fluoride suspension is about 120° C., then nearly anhydrous hydrogen fluoride is produced.

In another embodiment, the calcium fluoride product may be separated from the phosphoric acid after the removal of any undigested phosphate rock and silica, but before the addition of sulfuric acid. The calcium fluoride may be separated from the phosphoric acid using a centrifuge or any other technique known to one skilled in the art. Alternatively, mixing the suspension with an organic solvent that is miscible with phosphoric acid, such as methanol, ethanol, or isopropanol, reduces the calcium fluoride solubility and decreases the specific gravity of the solution, facilitating isolation of the calcium fluoride by centrifugation or gravity settling.

Suprisingly, the process of this invention provides a means for producing calcium fluoride with lower cost and higher purity than previously.

The calcium fluoride produced using this invention may have a F:Si weight ratio of greater than about 50:1, preferably greater than about 99:1.

Without further elaboration, it is believed that one skilled in the art can, using the description herein, utilize the present invention to its fullest extent. The following embodiments are, therefore, to be construed as merely illustrative, and do not constrain this disclosure in any way whatsoever.

EXAMPLES

Comparative Example A

Dried phosphate rock (66.1 g), ground to −100 mesh (−0.15 mm), was slurried in $H_2O$ (66.5 g), and heated to reflux (about 100° C.). $H_2SiF_6$ (25% aqueous, 93.0 g) was added over 10 minutes. The pH of the mixture at this point was 1.5. The slurry was stirred an additional hour at 100° C., and then poured into a graduated cylinder to settle overnight. The next day, the slurry had separated in to an upper layer of clear liquid, and a lower layer of grayish solids. X-ray diffraction of the solids showed $CaF_2$, quartz, and amorphous material.

This example shows that the high pH (about 1.5) and the low phosphate content of the slurry yielded $CaF_2$ that was not small enough to remain suspended for separation.

Comparative Example B

Dry phosphate rock (66 g), ground to −100 mesh (−0.15 mm), was slurried with water (31 g) and heated to 100° C. $H_2SiF_6$ (25% aqueous, 93.2 g) was added over 8 minutes. The pH of the mixture at this point was greater than 1. The temperature was maintained at reflux (about 102° C.) during the addition. The slurry was heated an additional 2 hours at 102° C. The heat was shut off and the slurry was cooled for 2.5 hours with stirring. The slurry was poured into a 50 mL centrifuge tube and spun 10 minutes at 2350 rpm (1112 RCF) in a centrifuge. The slurry separated into a clear liquid upper layer and a lower gray solid layer. X-ray diffraction of the solids showed $CaF_2$, quartz, and amorphous material.

This example is different from A in that less water is used, and the heating time is longer. Also, a centrifuge was used in this case, rather than gravity settling. As in A the $CaF_2$ particles were too large to remain suspended.

Comparative Example C $H_2SiF_6$ (25% aqueous, 204.65 g) was heated to 96° C. Dry phosphate rock (144.92 g), ground to −100 mesh (−0.15 mm), was added over 12 minutes. The slurry was heated an additional 2.5 hours, and then cooled for 2 hours while stirring. The slurry was filtered in a Buchner funnel using a 150 mm Whatman #3 filter (6 micron). The filtrate was nearly free of particulates. Analysis of the filtrate gave a fluoride content of 3.45 g, and a Si content of 0.80 g. This represents 8.5% of the fluoride and 8.0% of the silicon in the original $H_2SiF_6$.

This example was an attempt to duplicate Example 1 of U.S. Pat. No. 5,531,975. The fluoride yield was very low, and the F:Si ratio was the same as that in $H_2SiF_6$.

Comparative Example D $H_2SiF_6$ (25% aqueous, 271.75 g) was heated to 95° C. Dry phosphate rock (192.4 g), ground to −100 mesh (−0.15 mm), was added over 11 minutes. The slurry was heated 2 hours at 96° C., and then cooled 1 hour while stirring. The slurry was filtered in a 150 mm Buchner funnel using a Zitex coarse Teflon®(polytetrafluoroethylene) filter. The filtrate was nearly free of particulates. Analysis of the filtrate gave a fluoride content of 0.96 g and a Si content of 0.24 g. This represents 2.1% of the fluoride and 2.2% of the silicon in the original $H_2SiF_6$.

This example is similar to Example C, except that a coarser and more acid resistant filter was used.

Comparative Example E

Aqueous $H_2SiF_6$ (23.07%, 849.3 g) was heated to 95° C. Dry phosphate rock (555 g), ground to −100 mesh (−0.15 mm), was added over 6 minutes. The slurry was heated an additional 2 hours at 95° C., and then cooled for 2 hours while stirring, after which product slurry (1345.91 g) was recovered. A product sample (75.8 g, ~50 mL) was centrifuged for 20 minutes at 3000 rpm (1420 RCF) in a centrifuge. After centrifuging, the top 40% of the tube consisted of a clear brown liquid above a creamy white slurry, and the bottom 60% were gray solids. The clear and creamy layers were removed, diluted to 500 mL with methanol, and centrifuged to spin down the solids. The methanol was decanted and the solids were dried at 95° C. overnight. The solids (1.4062 g) were ground finely and dissolved for analysis. They contained 59.2% $CaF_2$, 26.0% $PO_4$, and 2.54% $SiO_2$.

The gray solids from the first centrifuging were diluted to 45 mL with 32% $H_3PO_4$, shaken well, and respun at 3000 rpm (1420 RCF) for 20 minutes to yield layers similar to the first centrifuging. The upper clear and creamy layers were removed and set aside. The bottoms were once more diluted to 45 mL with 32% $H_3PO_4$, shaken well, and respun at 3000 rpm for 20 minutes to yield layers similar to the first centrifuging. The upper clear and creamy layers from the two washing steps were combined and diluted to 500 mL with methanol and spun to isolate the solids. The methanol was decanted and the solids were dried at 95° C. overnight. These solids (1.5172 g) were finely ground and dissolved for analysis. They contained 45.7% $CaF_2$, 44.6% phosphate, and 2.82% $SiO_2$. The total $CaF_2$ recovered was 1.526 g (0.743 g fluoride) which is 8.5% of the theoretical yield of fluoride originating from the $H_2SiF_6$. The F:Si weight ratios in the two samples were 24.3:1 and 16.9:1.

Because so little $CaF_2$ remained suspended after 20 minutes of centrifuging, the above steps were repeated on another sample (81.0 g) of the product slurry, except that this sample was spun only 5 minutes. The two samples of $CaF_2$ recovered in this way weighed 3.4816 g and 3.0546 g. Analysis of these samples showed they contained 70.8% $CaF_2$, 14.6% phosphate, and 1.67% $SiO_2$ for the first sample, and 70.1% $CaF_2$, 18.2% phosphate, and 1.18% $SiO_2$ for the second sample. The total $CaF_2$ recovered was 4.606 g (2.242 g fluoride) which is 24.0% of the theoretical yield of fluoride originating from the $H_2SiF_6$. The F:Si weight ratios in the two samples were 44.3:1 and 62.2:1.

This example was an attempt to duplicate Example 1 of U.S. Pat. No. 5,531,975, except that centrifugation, rather than filtering, was used to isolate the $CaF_2$. However, the yield and purity of the $CaF_2$ produced by this method is low due to its relatively large particle size.

Example 1

$H_3PO_4$ (85%, 69.50 g) was mixed with $H_2SiF_6$ (23.4% aqueous, 139.66 g). The phosphoric acid concentration was 3.9 molar and the pH was less than −1. Dry phosphate rock (13 g), ground to −100 mesh (−0.15 mm), was added and the slurry was stirred one hour at room temperature. The slurry was then heated to 95° C. Phosphate rock was added in approximately 1.2 g aliquots over 94 minutes. Rock (104.1 g) was added in this way, for a total of 117.1 g of rock. The slurry was refluxed one hour at 106° C. after rock addition was complete, and then cooled while stirring. A sample (80.95 g) out of a total of 291.25 g of isolated slurry was centrifuged for 20 minutes at 3000 rpm. After centrifuging, the top 60% of the centrifuged slurry consisted of a creamy white slurry, and the bottom 40% was gray solids. The top layer was removed, diluted to 500 mL with methanol, and centrifuged to spin down the solids. The methanol was decanted, and the solids were dried at 95° C. overnight. The solids (12.11 g) were ground finely and dissolved for analysis. They contained 77.5% $CaF_2$, 14.1% $PO_4$, and 0.41% $SiO_2$.

The gray solids from the first centrifuging were diluted to 45 mL with 32% $H_3PO_4$, shaken well, and respun at 3000 rpm (1420 RCF) for 20 minutes to yield layers similar to the first centrifuging. The upper creamy layer was removed and set aside. The bottoms were once more diluted to 45 mL with 32% $H_3PO_4$, shaken well, and respun at 3000 rpm for 20 minutes to yield layers similar to the first centrifuging. The upper creamy layers from the two washing steps were combined and diluted to 500 mL with methanol and spun to isolate the solids. The methanol was decanted and the solids were dried at 95° C. overnight. These solids (6.38 g) were finely ground and dissolved for analysis. They contained 80.9% $CaF_2$, 14.8% phosphate, and 0.317% $SiO_2$.

The total $CaF_2$ recovered was 14.53 g (7.07 g fluoride) which is, unexpectedly, a significant improvement to 98.7% of the theoretical yield of fluoride originating from the $H_2SiF_6$. The F:Si weight ratios in the two samples were 197:1 and 266:1.

This example shows that $H_3PO_4$ must be added to the FSA at the start of the reaction, and the rock must be added incrementally to maintain a low pH. It also shows that the product slurry can be centrifuged for a long time at a high speed and the $CaF_2$ remains suspended.

What is claimed is:

1. A process for producing calcium fluoride, comprising:
   (a) mixing aqueous $H_3PO_4$ with aqueous $H_2SiF_6$ to form a mixture such that the concentration of $H_3PO_4$ is at least about 3 moles/liter;
   (b) adding phosphate rock to the mixture at a rate such that the pH of the mixture is maintained at less than about 1.0 and at a temperature sufficient to form a second mixture containing calcium fluoride and;
   (c) separating calcium fluoride from the second mixture.

2. The process of claim 1 wherein the concentration of aqueous phosphoric acid used in step (a) is 85 wt. %.

3. The process of claim 1 wherein the calcium fluoride separated from the second mixture has a particle size less than about $1\mu$.

4. The process of claim 1 wherein the calcium fluoride has a F:Si weight ratio of greater than about 50:1.

5. The process of claim 1 wherein the calcium fluoride has a F:Si weight ratio of greater than about 99:1.

6. The process of claim 1 wherein silica and undigested phosphate rock are removed from the second mixture to produce a suspension of the calcium fluoride in phosphoric acid.

7. The process of claim 6 wherein the suspension of the calcium fluoride in aqueous phosphoric acid is treated with excess sulfuric acid and heated to about 120° C. to produce nearly anhydrous hydrogen fluoride.

8. The process of claim 6 wherein additional phosphate rock is added to the suspension in an amount such that the ratio of Ca:F is at least about 1.3:1.

9. The process of claim 6 wherein the suspension is mixed with an organic solvent that is miscible with phosphoric acid.

10. The process of claim 9 wherein the organic solvent is selected from the group consisting of methanol, ethanol and isopropanol.

* * * * *